United States Patent
Kim et al.

(10) Patent No.: US 12,187,637 B2
(45) Date of Patent: Jan. 7, 2025

(54) APPARATUS AND METHOD FOR MANUFACTURING TEMPERED GLASS

(71) Applicant: Soon Ho Kim, Busan (KR)

(72) Inventors: Soon Ho Kim, Busan (KR); Chang Kyu Lee, Gyeongsangnam-do (KR)

(73) Assignee: Soon Ho Kim, Busan (KR)

( * ) Notice: Subject to any disclaimer, the term of this patent is extended or adjusted under 35 U.S.C. 154(b) by 995 days.

(21) Appl. No.: 17/049,594

(22) PCT Filed: Jul. 15, 2019

(86) PCT No.: PCT/KR2019/008687
§ 371 (c)(1),
(2) Date: Oct. 22, 2020

(87) PCT Pub. No.: WO2020/256209
PCT Pub. Date: Dec. 24, 2020

(65) Prior Publication Data
US 2021/0371331 A1 Dec. 2, 2021

(30) Foreign Application Priority Data

Jun. 21, 2019 (KR) .......................... 10-2019-0073814

(51) Int. Cl.
*C03C 21/00* (2006.01)
*C03B 25/087* (2006.01)
*C03C 23/00* (2006.01)

(52) U.S. Cl.
CPC .......... *C03C 21/002* (2013.01); *C03B 25/087* (2013.01); *C03C 23/0075* (2013.01); *C03C 23/0085* (2013.01)

(58) Field of Classification Search
CPC ........ C03B 25/087; C03B 27/052–056; C03B 35/202
See application file for complete search history.

(56) References Cited

U.S. PATENT DOCUMENTS 2,194,612 A * 3/1940 Paddock ............... C03B 35/205
65/349
2015/0344346 A1* 12/2015 Jiao ........................ C03B 25/08
65/29.11

FOREIGN PATENT DOCUMENTS

KR    100864956 B1    10/2008
KR    101076394 B1    10/2011
(Continued)

OTHER PUBLICATIONS

KR 10-10335462 B1 (Choi) Nov. 29, 2013 (English language machine translation). [online] [retrieved Sep. 21, 2023]. Retrieved from: Espacenet. (Year: 2013).*

*Primary Examiner* — Erin Snelting
(74) *Attorney, Agent, or Firm* — Bayramoglu Law Offices LLC

(57) ABSTRACT

An apparatus and a method for continuously manufacturing tempered glass are provided. The tempered glass is continuously manufactured by transferring the raw glass in one direction, spraying a boiled potassium nitrate solution to the raw glass to reinforce the raw glass, and recovering and reusing the potassium nitrate solution from the raw glass. This invention can reduce the time to manufacture tempered glass since you can manufacture tempered glass consecutively, and the cost of purchasing potassium nitrate solutions can be reduced, which has an economic advantage. Since the raw glass is preheated, strengthened and annealed by divided sections of preheating, strengthening and annealing section in one furnace, it is less likely that impurities will be attached to the raw glass due to low external exposure during each process movement, thus preventing deterioration of quality.

12 Claims, 3 Drawing Sheets

(56) References Cited

FOREIGN PATENT DOCUMENTS

| | | | |
|---|---|---|---|
| KR | 101143846 | B1 | 5/2012 |
| KR | 101312246 | B1 | 9/2013 |
| KR | 101335462 | B1 | 11/2013 |
| KR | 101821901 | B1 | 1/2018 |

* cited by examiner

APPARATUS AND METHOD FOR MANUFACTURING TEMPERED GLASS

CROSS REFERENCE TO THE RELATED APPLICATIONS

This application is the national phase entry of International Application No. PCT/KR2019/008687, filed on Jul. 15, 2019, which is based upon and claims priority to Korean Patent Application No. 10-2019-0073814, filed on Jun. 21, 2019, the entire contents of which are incorporated herein by reference.

TECHNICAL FIELD

The present invention relates to an apparatus for manufacturing tempered glass and method of manufacture, and more particularly, how to continuously manufacture tempered glass by transferring the raw glass one way, spray a boiled potassium nitrate solution to the raw glass to reinforce the raw glass, and making tempered glass manufacturing apparatus and method of manufacture by recovering and reusing the potassium nitrate solution from the raw glass.

BACKGROUND

In general, the strengthening of glass is largely divided into physical and chemical strengthening. Physical strengthening is a method that strengthens the internal strength of the glass by quenching the glass of more than 5 mm thick to a temperature between 550° C. to 700° C., this method is mainly used in the manufacture of tempered glass doors and automotive glass. However, this physical strengthening is not applicable to thin glass (3 mm), which cannot make a sufficient temperature difference between the glass surface layer and the center layer, and the glass has a low coefficient of thermal expansion. In case of glass with complex shapes, each part does not have a uniform temperature difference. Also, deformation is likely to occur because the operation is performed at a relatively high temperature (near the softening temperature).

On the other hand, chemical strengthening is to strengthen the glass by substituting the sodium ions contained in the glass and the potassium ions in the potassium nitrate solution by immersing the thin glass in the tempered furnace containing the potassium nitrate solution at 450° C. for at least 3 hours. This method is mainly used to strengthen thin glass below 2.0 mm.

The chemical strengthening method is to strengthen the glass through ion exchange, both thin glass and glass of complex shape can be strengthened, there is no fear of deformation during operation and high precision. In addition, it is superior to the physical strengthening in terms of strength, there is an advantage that can be cut after strengthening.

The above-mentioned chemical strengthening method first heats the glass to be strengthened below the transition temperature in the range of 300 to 450 C, and on the other hand, the potassium nitrate salt is melted at a temperature of 380° C. or higher to preheat the glass. After immersing, by maintaining a predetermined time or more to form a compressive stress layer on the surface of the glass to strengthen.

The existing tempered glass manufacturing technology is generally made on a small scale, and the manufacturing apparatus is also made by hand, the uniformity of the tempered glass quality cannot be obtained because the manufacturing of the tempered glass is carried out by a small manual work. Too many occurrences of defective products are produced during manufacture, and the manufacturing workers are exposed to dangers, and thus work involves large and small accidents.

Previously, Patent No. 10-1076394 (apparatus for manufacturing tempered glass) registered in Korea issued a manufacturing apparatus that produces large quantities of tempered glass. This is a manufacturing apparatus that strengthens the raw glass by immersing the raw glass on a strengthening furnace with a solution of heated potassium nitrate.

The apparatus for manufacturing tempered glass under the above patent is to move the rack with raw glass to each bath such as tempering bath, annealing bath, etc. using a moving cart, and manufacture tempered glass by immersing and lifting the raw glass placed in the each bath rack, and repeating the same process to the next bath.

Therefore, strengthening the glass on a single rack requires vertical and horizontal movement of each bath placed in order of the process, which takes a lot of time to manufacture tempered glass because large quantities of raw glass are not able to be strengthened consecutively.

In addition, the manufacture apparatus of the above conventional patents have the disadvantage of not being able to reuse the potassium nitrate dust that falls on the top of each cover, and when moving to each bath, potassium nitrate dust falls on the cover installed at the top of each bath, requiring frequent replacement of the above cover.

SUMMARY

The purpose of this present invention is to provide apparatus for manufacturing tempered glass and method of manufacture that can be manufactured in a continuous process that moves in one direction, thereby shortening the manufacturing time of tempered glass and simplifying the process.

Also, the purpose of this present invention is to provide apparatus for manufacturing tempered glass and method of manufacture that can reduce the amount of potassium nitrate solution that is disposed of by recovering and reusing the potassium nitrate solution from the raw glass.

The purposes of this present invention are not limited to those mentioned above, and other purposes not mentioned may be clearly understood by those with ordinary knowledge in the technical filed of this invention from the following.

To achieve the above purposes, tempered glass manufacturing apparatus that manufacture tempered glass consecutively under this invention include a mainframe; a guide rail which moves in one direction and installed parallel to the upper left and right sides of the main frame above; a rack equipped with a temperature sensing sensor on one side that holds a large number of raw glass inside and can measure the temperature of the raw glass; a transport apparatus which the lower part is coupled with the upper part of the above rack and the upper part is coupled to the above guide rail, which moves horizontally in one direction according to the movement of the above guide rail; a strengthening furnace that is formed long along the length direction of the above main frame on the inner ground of the above main frame, and has strengthening section that strengthens the above raw glass by spraying a potassium nitrate solution heated to the above raw glass and maintaining it for a predetermined time; a cleaning apparatus for cleaning tempered glass from the above strengthening furnace; and a drying apparatus for drying the above tempered glass cleaned from the above cleaning apparatus.

The above strengthening furnace of this invention includes pre-heating section which is formed on the front side of the above strengthening section for pre-heating the above raw glass at a predetermined temperature before spraying the potassium nitrate solution to the above raw glass, and annealing section which is formed at the rear of the above strengthening section for removes stress by slowly cooling the above raw glass from the above strengthening section.

Also, the above tempered glass manufacture apparatus include potassium nitrate solution manufacturing apparatus installed on the outside of the above strengthening section and connected with the above strengthening section by coupling with one side of supply section which supplies a manufactured potassium nitrate solution, and spraying apparatus installed on the left and right sides of the above strengthening furnace which has a number of spraying sections to be sprayed towards the inner direction of the above strengthening section by coupling with the other side of the above potassium nitrate solution supply section. The above apparatus for manufacturing potassium nitrate solution also has the stirring section that stirs the potassium nitrate solution supplied to maintain a predetermined concentration, and heating section for heating the above potassium nitrate solution. Thus, it maintains a constant concentration of the above potassium nitrate solution, supply the above heated potassium nitrate solution to the supply section of the above potassium nitrate solution, and spray to the above raw glass which has entered the above strengthening section through the above spray apparatus.

At this time, the above tempered glass manufacturing apparatus include a recovery apparatus for a potassium nitrate solution installed on the bottom of the above strengthening section. The above recovery apparatus for a potassium nitrate solution features the reuse of the above potassium nitrate solution by sending the potassium nitrate solution recovered by the above potassium nitrate solution recovery apparatus to the above potassium nitrate solution manufacturing apparatus through recovery hole formed on the bottom of the above strengthening section.

A tempered glass manufacturing method for continuous manufacture of tempered glass includes a preparation stage of the raw glass for fixing a large number of the raw glass to the rack; coupling stage of the transport apparatus which coupling the above rack prepared in the preparation stage of the raw glass so that the raw glass can be transported in the order of the process along the guide rails installed on the upper left and right sides of the main frame; strengthening stage for manufacturing tempered glass by spraying a heated potassium nitrate solution to the above raw glass and maintaining a predetermined temperature to strengthen the above raw glass once the above raw glass is transported along the above guide rail to the strengthening section of strengthening furnace; cleaning stage for cleaning the above tempered glass which has undergone the above strengthening stage; and drying stage for drying the above tempered glass which has undergone the above cleaning stage.

At this time, the manufacturing method of tempered glass under this invention is additionally include a pre-heating stage for pre-heating the above raw glass at a predetermined pre-heating temperature at the pre-heating section of the above strengthening furnace before the above strengthening stage, and annealing stage that slowly cooling down to remove stress by transferring to the annealing section of the above strengthening furnace.

The above tempered glass manufacturing method features a recovery apparatus for potassium nitrate solution that recovers the above potassium nitrate solution flowing down from the above raw glass after being sprayed into the above raw glass during the above strengthening stage.

At this time, during the above pre-heating stage, strengthening stage and annealing stage, the temperature of the above raw glass is measured with the temperature sensor installed in the above rack, and the movement speed of the above transport apparatus and the temperature of the above strengthening furnace are adjusted according to the temperature of the above raw glass. Thus, it allows ion exchange of potassium nitrate to be performed more effectively.

An apparatus for manufacturing tempered glass and method of manufacture according to this invention reach each process with only one-way horizontal transport without vertical movement of a rack with fixed raw glass, which makes it possible to manufacture tempered glass consecutively, thus shortening the manufacture time of tempered glass.

Also, there is an economic advantage since the amount of potassium nitrate solution discarded can be reduced by recovering potassium nitrate solution falls from the raw glass after spraying the potassium nitrate solution to the raw glass, which allows the cost of purchasing potassium nitrate solution to be reduced.

In addition, since the raw glass is preheated, strengthened and annealed by divided sections of preheating, strengthening and annealing section in one furnace, it is less likely that impurities will be attached to the above raw glass due to low external exposure during each process movement, thus preventing deterioration of quality.

| <Explanation of symbols> | |
| --- | --- |
| 10: Main Frame | 11: Vertical Frame |
| 12: Horizontal Frame | 14: Guide Rail |
| 16: $1^{st}$ Conveyor | 17: $2^{nd}$ Conveyor |
| 18: $3^{rd}$ Conveyor | 20: Rack |
| 21: Vertical Frame | 22: Horizontal Frame |
| 30: Transport Apparatus | 40: Strengthening Furnace |
| 42: Pre-heating Section | 44: Strengthening Section |
| 44a: Recovery Hole | 46: Annealing Section |
| 50: Potassium Nitrate Solution Manufacturing Apparatus | 52: Supply Section |
| 60: Potassium Nitrate Solution Spray Apparatus | 62: Spray Section |
| 70: Potassium Nitrate Solution Recovery Apparatus | 72: Recovery Section |
| 80: Cleaning Apparatus | 90: Drying Apparatus |
| S10: Raw Glass Preparation Stage | S20: Transport Apparatus Coupling Stage |
| S30: Pre-heating Stage | S40: Strengthening Stage |
| S50: Annealing Stage | S60: Cleaning Stage |
| S70: Drying Stage | |

DETAILED DESCRIPTION OF THE EMBODIMENTS

The advantages and features of this invention, and how to achieve them will be clarified by referring to the detailed embodiments together with drawings attached. However, this invention will not be limited to embodiments below but will be implemented in various different forms, and these embodiments only allow the initiation of this invention to be complete. It is provided to fully inform the category of the invention to the general knowledgeable person in the technical filed to which this invention belongs, and this invention is only defined by the category of claims.

Refer to the drawings attached below and explain in detail the details for the implementation of this invention. The same symbol numbers regardless of the drawings refers to the same component, and "and/or" includes each and one or more combination of the items mentioned.

The terms used in this specification are intended to illustrate embodiments and are not intended to limit this invention. In this specification, the singular form also includes the plural form unless specifically mentioned in the sentence. The "comprises" and/or "comprising" used in this specification do not preclude the presence or addition of one or more components other than those mentioned.

Unless otherwise defined, all terms (including technical and scientific terms) used in this specification may be used in a sense that can be understood in common to persons with ordinary knowledge in the technical field to which this invention belongs. In addition, commonly used predefined terms are not ideally or excessively interpreted unless they are explicitly specifically defined.

Refer to the drawings attached below to explain desirable embodiments of this invention in detail.

Figure 1:
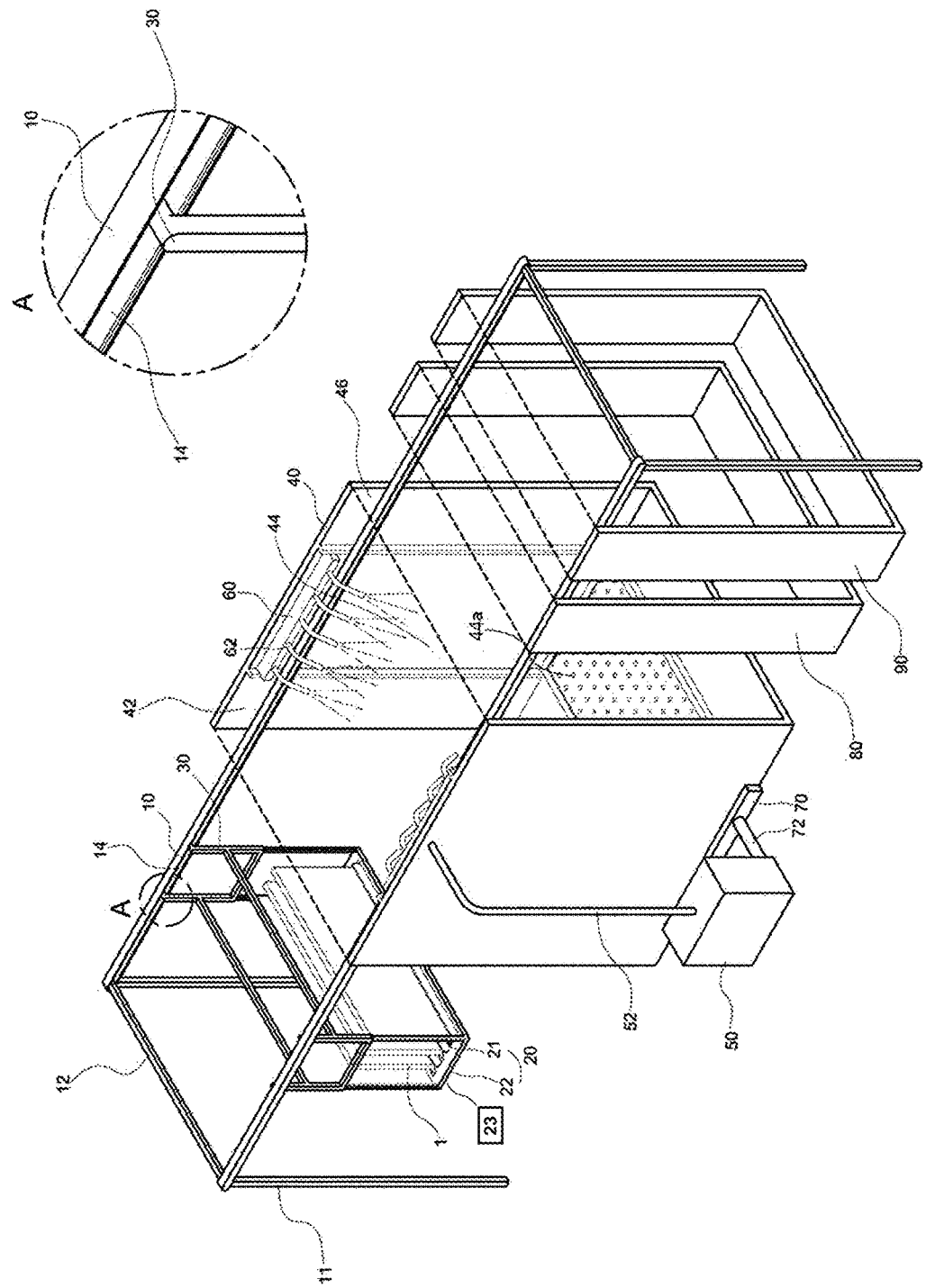
FIG. 1 is an overall perspective view of a tempered glass manufacturing apparatus according to the present invention.

FIG. 1 is an overall perspective view of a tempered glass manufacturing apparatus according to the present invention.

Referring to FIG. 1, the tempered glass manufacturing apparatus under this invention include main frame (10), rack (20), transport apparatus (30), strengthening furnace (40), potassium nitrate solution manufacturing apparatus (50), potassium nitrate solution recovery apparatus (70), cleaning apparatus (80), and drying apparatus (90).

The above main frame (10) is the base skeleton of the tempered glass manufacturing apparatus, with four vertical frames (11) fixed perpendicular to the ground, and coupling the horizontal frame (12) connecting the two above vertical frame (11). The two horizontal frames (12) are formed parallel to each other. The above main frame (10) is not limited to the above-mentioned shapes and, of course, may also improve the stability of the main frame (10), including the vertical frame (11) and the horizontal frame (12).

The above horizontal frame (12) of the above main frame (10) is equipped with a guide rail (14) parallel to the horizontal frame above (12). The above guide rail (14) moves from one end to the other end of the length direction of the main frame (10) above through conveyor, and the above transport apparatus (30) enable to move horizontally so that continuous processing is possible. You can adjust the transport speed of the guide rail (14) above to adjust the time of stay according to the manufacturing process.

The above rack (20) is capable of fixing a number of raw glasses (1) inside and consists of a number of vertical frames (21) and horizontal frames (22). One side of the above vertical frame (21) is coupling to four corners of the above horizontal frame (22) of a rectangle which coupling to the floor surface and above vertical frame (1) may be added for safety. It is desirable that the above rack (20) consists of a material that can withstand the high temperature set in the above strengthening furnace (40).

One side of the above rack (20) coupling a temperature sensor (23) that can measure the temperature of the above raw glass (1). It is recommended that the above temperature sensor (23) is non-contactable sensor since it verifies that the raw glass (1) above keep at an appropriate temperature according to the temperature regulated inside the above strengthening furnace (40). Also it is desirable to verity the temperature at various points of the raw glass (1) above by having a number of the above temperature sensors.

The bottom part of the above transport apparatus (30) is coupling with the top of the above rack (20), and the top part is installed in the above guide rail (14) so that the above rack (20) and the above raw glass (1) move horizontally in one direction as the above guide rail (14) moves. It is desirable that the above transport apparatus (30) consists of a material that can withstand the above strengthening furnace (40) maintained at high temperature, and is formed by coupling with several frames as illustrated in the drawings.

The combination of the above transport apparatus (30) and the above rack (20) allows for various types of coupling, such as insert combination, and bolt/nut combination, etc.

The above strengthening furnace (40) is a long furnace installed on the ground so that it is located at the center of the above main frame (10) and preferably formed as an empty rectangle inside.

The above raw glass (1) is fixed in the above rack (20) and combines the above rack (20) with the above transport apparatus (30) to move the above transport apparatus (30) horizontally in accordance with the movement of the above guide rail (14) of the main frame (10), allowing the above raw glass (1) to enter and exit the above strengthening furnace (40). It is desirable that the above strengthening furnace (40) includes an entry and exit door in order to prevent internal heat from escaping, and the doors are automatically opened and closed.

The above strengthening furnace (40) is divided into three sections; pre-heating section (42), strengthening section (44) and annealing section (46). The above strengthening furnace (40) has a heater built inside and can be adjusted to different temperatures depending on each zone. For the heating method of the above strengthening furnace (40), besides the heating by built-in heaters, you can also heat by blowing hot temperature wind. Also, the heathers are installed within the above strengthening furnace (40) at a certain distance to distinguish each zone. Thus, the above pre-heating section (42), strengthening section (44) and annealing section (46) can be distinguished, and automatic opening and closing doors may be installed between each zone.

The above pre-heating section (42) preheats the raw glass (1) above for a certain period of time to prevent damage to the glass due to thermal shock during sudden high temperature heating. It is recommended, but not limited, that the above pre-heating section (42) maintains the internal temperature so that the above raw glass (1) is pre-heated to 100-350° C. The pre-heating of the raw glass (1) can be controlled by controlling the heather temperature, adjusting the transport speed of the above guide rail (12) and adjusting the transport stop time of the above guide rail (12), etc.

Using the above temperature sensor (23) installed in the above rack (20), it is possible to check non-contractively that the above raw glass (1) is heated to the pre-heating temperature, and move to the next zone once the temperature is pre-heated to a predetermined pre-heating temperature is confirmed by measuring the temperature of the several raw glasses (1). Using the above temperature sensor (23), it is possible to measure the temperature of the raw glass (1) according to the zone within the strengthening furnace (40). If the temperature of the above raw glass (1) does not reach the pre-determined pre-heating temperature, the temperature of the above pre-heating section (42) may be adjusted.

The above strengthening section (44) is an area for manufacturing tempered glass through chemical strengthening by spraying the heated potassium nitrate ($KNO_3$) solution into the preheated raw glass (1) above, and heating at a high temperature for a certain period of time to substitute the sodium ions contained in the glass and the potassium ions in the potassium nitrate solution.

It is desirable that the above potassium nitrate solution is heated to 100-400° C., and the above strengthening section (44) is heated to maintain a temperature similar to that of the above heated potassium nitrate solution. A potassium nitrate solution spray apparatus (60) is installed to spray a potassium nitrate solution in the above raw glass (1). The above potassium nitrate solution spray apparatus (60) is installed on the upper left and right sides of the above strengthening section (44) and is equipped with a number of spray sections (62) to spray a potassium nitrate solution.

It is recommended, but not limited, that the above potassium nitrate solution spray apparatus (60) is installed on the upper left and right sides of the above strengthening section (44) respectively, as illustrated in FIG. 1, and multiple sets may be installed on the side of left and right of the above strengthening section (44).

The potassium nitrate solution is manufactured from potassium nitrate solution manufacturing apparatus (50) installed externally in the above strengthening furnace (40), and one side is combined to the potassium nitrate solution manufacturing apparatus (50) and the other side is combined to the potassium nitrate solution spray apparatus (60). It is supplied to potassium nitrate solution manufacturing apparatus (60) by the connected supply section (52), and sprayed to the above raw glass (1).

It is recommended, but not limited, that the above potassium nitrate solution manufacturing apparatus (50) is installed on the left and right sides of the above strengthening furnace (40) and combined with the above potassium nitrate solution spray apparatus (60) installed on the left and right sides of the above strengthening section (44).

The above potassium nitrate solution manufacturing apparatus (50) is equipped with a stirring section (not illustrated) that stirs the concentration of the potassium nitrate solution supplied internally so that that constant keep at a predetermined concentration, and heating section (not illustrated) that heats a potassium nitrate solution to provide a heated potassium nitrate solution.

Therefore, this invention always provides a potassium nitrate solution of constant concentration and temperature, including the above potassium nitrate solution manufacturing apparatus (50), so that the quality of the tempered glass being manufactured can always be maintained constant.

In addition, the tempered glass manufacturing apparatus under this invention includes a potassium nitrate solution recovery apparatus (70) installed on the bottom of the above strengthening section (44). After spraying a heated potassium nitrate solution in the above raw glass (1), a potassium nitrate solution dropped from the above raw glass (1) is recovered to the above potassium nitrate solution recovery apparatus (70) through a number of recovery holes (44a) formed on the bottom of the above strengthening section (44). The one side is combined to the one side of the above potassium nitrate solution recovery apparatus (70) and the other side is combined to the one side of the above potassium nitrate solution manufacturing apparatus (50). It reuses the potassium nitrate solution by sending the potassium nitrate solution back to the above potassium nitrate solution manufacturing apparatus (50) through the connected recovery section (72).

The above recovery section (72) is installed on the left and right sides of the above potassium nitrate solution recovery apparatus (70) and may be combined with the above potassium nitrate solution manufacturing apparatus (50), and of course, one of the above recovery sections (72) can be installed on the left or right sides of potassium nitrate solution recovery apparatus (70) and combined with the above potassium nitrate solution manufacturing apparatus (50).

The above annealing section (46) removes the stress by cooling the tempered raw glass (1) slowly in the above strengthening section (44). In the above annealing section (46), the internal temperature is maintained at 50-200° C. to allow the tempered raw glass (1) to cool slowly without being exposed to room temperature. This is to prevent the potassium nitrate solution hardens and becomes dusty or damage to the above raw glass (1) due to rapid temperature drop when exposed to room temperature immediately right after tempering the above raw glass (1).

In the above annealing section (46), water or wind may be sprayed to cool the tempered raw glass (1) in order to cool it down.

The tempered glass manufacturing apparatus under this invention shall strengthen the above raw glass (1) in the above strengthening furnace (40), and then remove impurities from the surface of the tempered raw glass (1) by including the cleaning apparatus (80) for cleaning the tempered raw glass (1) and the drying apparatus (90) for drying the cleaned glass.

The above cleaning apparatus (80) cleans the above raw glass (1) by including a spray section (not illustrated) where the water is sprayed to clean the above tempered raw glass (1) and recovery section (not illustrated) for recovering cleaned water. The above drying apparatus (90) is designed to dry by supplying hot air to remove any remaining water from the tempered glass (1).

As state above, the tempered glass manufacturing apparatus under this invention are divided into preheating, strengthening and annealing zones to preheat, strengthen and cool down the raw glass. Therefore, due to low external exposure during each process movement, impurities are less unlikely to be attached to the above raw glass which prevents deterioration of quality, and the material cost can be reduced by recovering and reusing the potassium nitrate solution dropped from the above raw glass.

Figure 2:
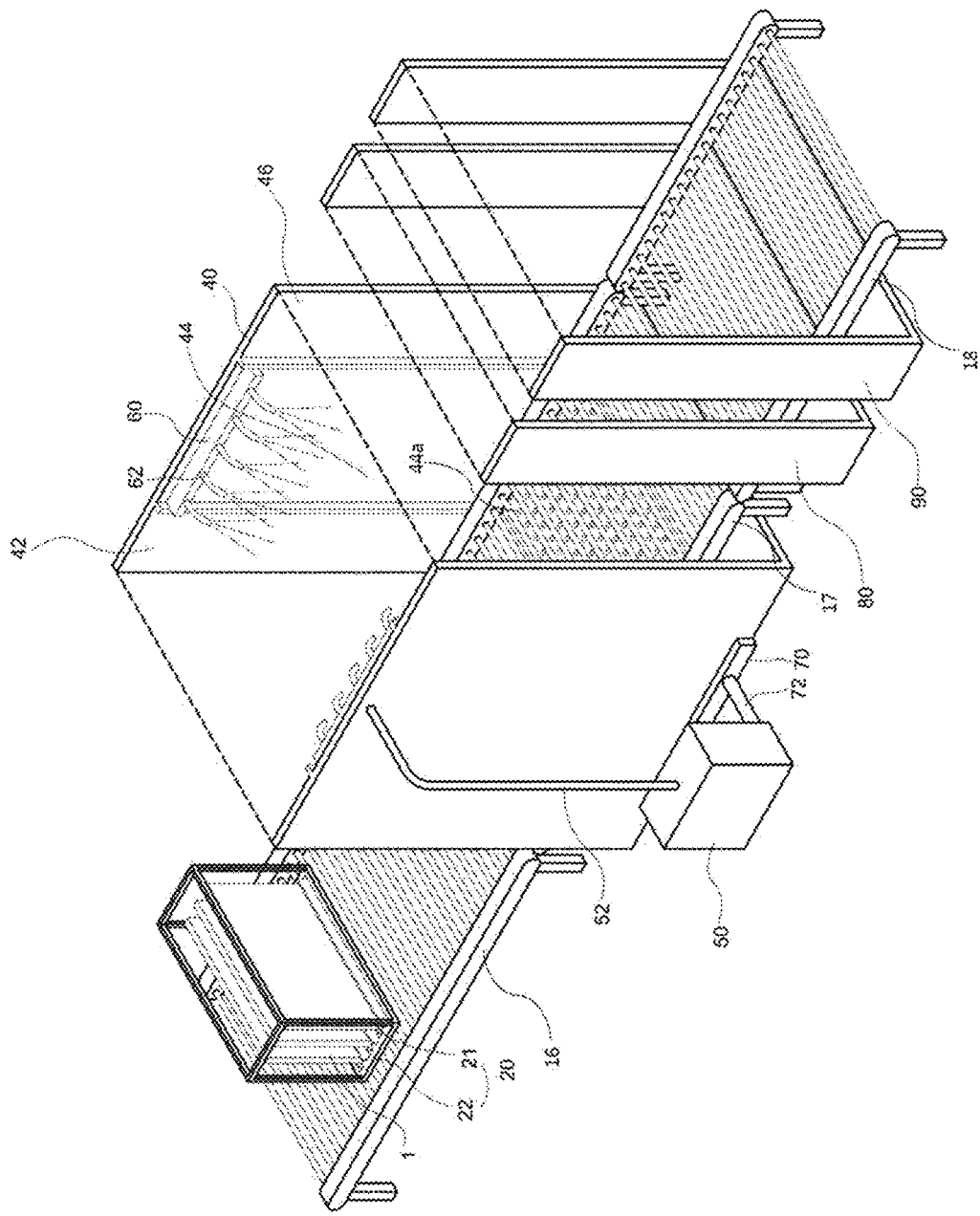
FIG. 2 is an overall perspective view of a tempered glass manufacturing apparatus according to the other embodiment of this present invention.

FIG. 2 is an overall perspective view of a tempered glass manufacturing apparatus according to the other embodiment of this present invention. If you refer to FIG. 2, the tempered glass manufacturing apparatus in accordance with the other embodiment of this invention moves the raw glass (1) fixed in the rack (20), including conveyors (16, 17, 18).

It is recommended, but not limited, that the above conveyors (16, 17, 18) are mounted on the ground and are roller conveyor. The first conveyor (16) installed on the front side of the strengthening furnace (40), the second conveyor (17) installed inside the strengthening furnace (40) and the third conveyor (18) installed at the rear side of the strengthening furnace (40). The gap between each of the conveyors (16, 17, 18) is formed in a narrow manner, so that the above rack (20) and the above raw glass (1) are automatically moved to next conveyor when moving between the above conveyors (16, 17, 18).

It is desirable that the above second conveyor (17) installed inside the above strengthening furnace (40) consists of materials that withstand high temperatures, and of course the first and third conveyor (16, 18) above may also consist of the same material.

The above conveyors (16, 17, 18) are intended to transport the raw glass (1) in place of the main frame (10), guide rail (12) and transport apparatus (30) as described in FIG. 1, so tempered glass manufacturing apparatus in accordance with other embodiments of this invention are constructed except for main frame (10), guide rail (12) and transport apparatus (30). Except for the above configurations, the remaining configurations are the same as those set out in FIG. 1.

Figure 3:
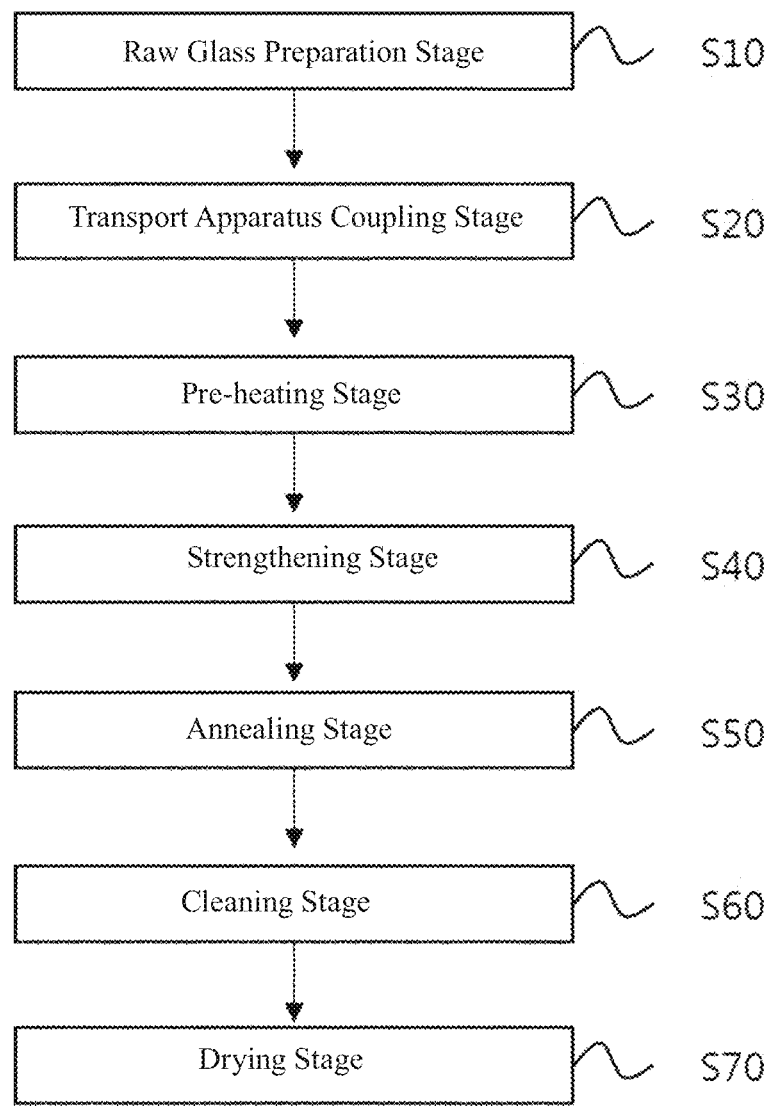
FIG. 3 is a flow chart of a tempered glass manufacturing apparatus according to the present invention.

FIG. 3 is a flow chart of a tempered glass manufacturing apparatus according to the present invention. The tempered glass manufacturing method according to this invention include the raw glass preparation stage (S10), transport apparatus coupling stage (S20), pre-heating stage (S30), strengthening stage (S40), annealing stage (S50), cleaning stage (S60) and drying stage (S70).

The above raw glass preparation stage (S10) is to secure the number of the raw glass (1) to the rack (20) so that the numbers of raw glass (1) can be manufactured with tempered glass depending on the process of the tempered glass manufacturing apparatus.

The above transport apparatus coupling stage (S20) is the stage in which the above rack (20) combined with a number of the above raw glass (10) is coupling with the above transport apparatus (30). The coupling of the above rack (20) and the above transport apparatus (30) may be an insert combination, and bolt/nut combination, etc. The upper part of the above transport apparatus (30) is mounted on a guide rail (14) coupled to the upper left and right sides of the main frame (10), allowing it to be moved horizontally according to the movement of the guide rail (14) above. Therefore, as the above guide rail (14) moves, the above raw glass (1) moves horizontally in the order of the process.

Following is the pre-heating stage (S30), in which as the above guide rail (12) moves, the above raw glass (1) moves and reach to the pre-heating section (42), the first section of the strengthening furnace (40). The above pre-heating section (42) maintains the internal temperature so that the raw glass (1) is preheated to 100-350° C. The temperature sensor (23) installed in the above rack (20) measure the temperature of the above raw glass (1) and if it does not reach the pre-determined pre-heating temperature, you can adjust the heating temperature of the pre-heating section (42) and moving speed of the above guide rail (12).

Following is the strengthening stage (S40). Locate the raw glass (1) which is pre-heated at the above the pre-heating stage (S30) to the second section of strengthening section (44) for the above strengthening furnace (40). In the above strengthening section (44), a heated potassium nitrate solution is sprayed on the above raw glass (1) by using a potassium nitrate solution spray apparatus (60) installed on the left and right sides of the strengthening section (44), and it makes the above raw glass (1) to be strengthened through chemical reaction. It is desirable that the potassium nitrate solution above is heated to 100-400° C. The above strengthening section (44) is heated to maintain a temperature similar to that of the above heated potassium nitrate solution.

Then the potassium nitrate solution is sprayed into the raw glass (1) and kept in the above strengthening section (44) for a period of time to ensure sufficient ion exchange can be performed to strengthen the above raw glass (1) chemically.

The potassium nitrate solution is manufactured by a potassium nitrate solution manufacturing apparatus (50) located outside of the above strengthening furnace (40), and the above potassium nitrate solution manufacturing apparatus (50) include a stirring section that stirs the concentration of the potassium nitrate solution supplied to maintain a constant concentration, and heating section that heats a potassium nitrate solution to provide a heated potassium nitrate solution.

In addition, a potassium nitrate solution recovery apparatus (70) is installed on the bottom of the above strengthening section (44), and a potassium nitrate solution dropped from the above raw glass (1) is recovered through the recovery hole to the potassium nitrate solution recovery apparatus (70) and reused.

The following annealing stage (S50) is the stage where the tempered raw glass (1) is moved horizontally to the annealing section (46), the third section of the above strengthening furnace (40), to remove the stress by slowly cooling down and to prevent the damage to the above raw glass (1) due to rapid temperature change. In the above annealing section (46), the internal temperature is maintained at 50-200° C. and the temperature can be controlled by adjusting the temperature of internal heater or by spraying water or wind.

The following cleaning stage (S60) is the cleaning phase of the tempered raw glass (1) from the above strengthening furnace (40), and after cleaning, the tempered raw glass (1) is dried through the drying stage (S70) to manufacture the tempered glass.

As state above, the tempered glass manufacturing method under this invention can be manufactured in a continuous process that requires only horizontal movement without vertical movement of the raw glass, thereby simplifying the manufacturing method and shortening the manufacturing time.

Although the embodiments of this invention have been described by referring to the attached drawings, any person with ordinary knowledge in the technical field to which this invention belongs will be able to understand that this invention can be carried out in the other specific forms without changing its technical ideas or essential features. Thus, the embodiments described above should be understood to be illustrative and non-limited in all respect.

What is claimed is:
1. A tempered glass manufacturing apparatus for a continuous manufacture of a tempered glass, comprising:
  a main frame comprising two parallel horizontal rails extending along one direction, the two parallel horizontal rails comprising an upper left side rail and an upper right side rail;
  a guide rail, wherein the guide rail moves along the one direction, the guide rail comprises a first guide rail and a second guide rail, and the first guide rail and the second guide rail are installed parallel to the upper left side rail and the upper right side rail of the main frame;
  a rack equipped with a temperature sensor on one side of the rack, wherein the rack holds a number of raw glass portions inside and the temperature sensor measures a temperature of the raw glass portions;
  a transport apparatus having a lower part and an upper part, wherein the lower part is coupled with an upper part of the rack and the upper part of the transport apparatus is coupled to the guide rail, and the transport apparatus moves horizontally in the one direction of the guide rail;

a strengthening furnace, wherein the strengthening furnace is formed along a length direction of the main frame on an inner ground of the main frame, and has a strengthening section, wherein the strengthening section strengthens the raw glass portions by spraying a potassium nitrate solution heated to the raw glass portions and maintaining the potassium nitrate solution heated on the raw glass portions for a predetermined time, the strengthening section having a plurality of recovery holes formed in a bottom of the strengthening section;

a cleaning apparatus for cleaning the tempered glass from the strengthening furnace; and a drying apparatus for drying the tempered glass cleaned from the cleaning apparatus.

2. The tempered glass manufacturing apparatus of claim 1, further comprising a pre-heating section and an annealing section, wherein the pre-heating section is formed on a front side of the strengthening section for pre-heating the raw glass portions at a predetermined heating temperature before spraying the potassium nitrate solution heated to the raw glass portions, and the annealing section is formed at a rear of the strengthening section to remove a stress by cooling the raw glass portions from the strengthening section for a specified period of time.

3. The tempered glass manufacturing apparatus of claim 2, wherein each of the sections is configured to be adjustable to separate temperatures.

4. The tempered glass manufacturing apparatus of claim 2, wherein a heating temperature of the pre-heating section is configured to be adjustable to allow adjustment of the heating temperature, in response to a temperature of the raw glass portions inside the pre-heating section being below a pre-specified temperature.

5. The tempered glass manufacturing apparatus of claim 2, wherein the guide rail in the pre-heating section is configured to have a specified transport stop time for the raw glass portions to pre-heat to a pre-specified temperature.

6. The tempered glass manufacturing apparatus of claim 1, further comprising a potassium nitrate solution manufacturing apparatus, wherein the potassium nitrate solution manufacturing apparatus comprises a supply section, a spraying apparatus, a stirring section, and a heating section;

wherein the potassium nitrate solution manufacturing apparatus is installed on an outside of the strengthening section and connected with the strengthening section by coupling with a first side of the supply section, wherein the supply section supplies a manufactured potassium nitrate solution;

the spraying apparatus is installed in the strengthening furnace on the upper left side rail and the upper right side rail of the main frame, and the spraying apparatus has a number of spraying sections spraying towards an inner direction of the strengthening section, and the spraying apparatus is coupled with a second side of the supply section;

the stirring section is configured for stirring the potassium nitrate solution supplied to maintain a predetermined concentration, and the heating section is configured for heating the potassium nitrate solution; and the potassium nitrate solution manufacturing apparatus maintains a constant concentration of the potassium nitrate solution, heats the potassium nitrate solution, supplies the potassium nitrate solution heated to the supply section, and sprays the heated potassium nitrate solution on the raw glass portions entering the strengthening section through the spray apparatus.

7. The tempered glass manufacturing apparatus of claim 6, further comprising a recovery apparatus for the potassium nitrate solution, wherein the recovery apparatus is installed at a bottom of the strengthening section, and the recovery apparatus features a reuse of the potassium nitrate solution by sending the potassium nitrate solution recovered by the recovery apparatus to the potassium nitrate solution manufacturing apparatus through the plurality of recovery holes formed in the bottom of the strengthening section.

8. The tempered glass manufacturing apparatus of claim 1, wherein the raw glass portions are supported in the rack by a bottom portion of the rack.

9. A tempered glass manufacturing method for a continuous manufacture of a tempered glass using the tempered glass manufacturing apparatus for a continuous manufacture of a tempered glass according to claim 1, comprising:

a preparation stage of raw glass for fixing a number of the raw glass to the rack;

a coupling stage of the transport apparatus for coupling the rack prepared in the preparation stage of the raw glass so that the raw glass is transported in an order of a process along the first guide rail and the second guide rail installed on an upper left side and an upper right side of the main frame;

a strengthening stage for manufacturing the tempered glass by spraying a heated potassium nitrate solution to the raw glass and maintaining a predetermined temperature to strengthen the raw glass once the raw glass is transported along the guide rails to the strengthening section of the strengthening furnace;

a cleaning stage for cleaning the tempered glass after the strengthening stage; and a drying stage for drying the tempered glass after the cleaning stage.

10. The tempered glass manufacturing method of claim 9, further comprising a pre-heating stage for pre-heating the raw glass at a predetermined pre-heating temperature at a pre-heating section of the strengthening furnace before the strengthening stage, and an annealing stage for slowly cooling down the raw glass pre-heated to remove a stress by transferring the raw glass pre-heated to an annealing section of the strengthening furnace.

11. The tempered glass manufacturing method of claim 10, wherein during the pre-heating stage, the strengthening stage and the annealing stage, a temperature of the raw glass is measured with a temperature sensor installed in the rack, and a movement speed of the transport apparatus and a temperature of the strengthening furnace are adjusted according to the temperature of the raw glass to allow an ion exchange of potassium nitrate to be performed.

12. The tempered glass manufacturing method of claim 9, wherein the tempered glass manufacturing apparatus further comprises a recovery apparatus for potassium nitrate solution to recover the potassium nitrate solution flowing down from the raw glass after being sprayed to the raw glass during the strengthening stage.

* * * * *